US 012518668B2

United States Patent
Peng et al.

(10) Patent No.: US 12,518,668 B2
(45) Date of Patent: Jan. 6, 2026

(54) IMAGE PROCESSING METHODS AND APPARATUSES, ELECTRONIC DEVICES AND STORAGE MEDIA

(71) Applicants: Beijing BOE Optoelectronics Technology Co., Ltd., Beijing (CN); BOE Technology Group Co., Ltd., Beijing (CN)

(72) Inventors: Xiangjun Peng, Beijing (CN); Tiankuo Shi, Beijing (CN); Chenxi Zhao, Beijing (CN); Yifan Hou, Beijing (CN); Shuo Zhang, Beijing (CN); Yan Sun, Beijing (CN); Zhihua Ji, Beijing (CN); Yanhui Xi, Beijing (CN); Wei Sun, Beijing (CN); Xin Duan, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 258 days.

(21) Appl. No.: 18/265,643

(22) PCT Filed: Dec. 11, 2020

(86) PCT No.: PCT/CN2020/135706
§ 371 (c)(1),
(2) Date: Jun. 6, 2023

(87) PCT Pub. No.: WO2022/120799
PCT Pub. Date: Jun. 16, 2022

(65) Prior Publication Data
US 2024/0046836 A1    Feb. 8, 2024

(51) Int. Cl.
*G09G 3/20*    (2006.01)

(52) U.S. Cl.
CPC ............ *G09G 3/2003* (2013.01); *G09G 2320/0233* (2013.01); *G09G 2320/0242* (2013.01); *G09G 2320/0666* (2013.01); *G09G 2340/06* (2013.01)

(58) Field of Classification Search
None
See application file for complete search history.

(56) References Cited

U.S. PATENT DOCUMENTS

| | | | |
|---|---|---|---|
| 2013/0039575 A1 | 2/2013 | Livingston et al. | |
| 2013/0129215 A1* | 5/2013 | Jiang | G06T 7/44 382/168 |
| 2021/0193018 A1 | 6/2021 | Zhou et al. | |

FOREIGN PATENT DOCUMENTS

| | | |
|---|---|---|
| CN | 103106668 A | 5/2013 |
| CN | 103699532 A | 4/2014 |

(Continued)

OTHER PUBLICATIONS

PCT/CN2020/135706 international search report.
(Continued)

*Primary Examiner* — Nurun Flora
(74) *Attorney, Agent, or Firm* — IPro, PLLC

(57) ABSTRACT

An image processing method and apparatus, an electronic device and a storage medium are provided. The method includes: obtaining an original image, and for each of pixels in the original image, converting first color data of the pixel into second color data corresponding to a set color space (S12); calculating a feature weighted value of the pixel according to the second color data and a preset rule (S14); and determining a uniformity of the pixels based on the feature weighted values to mark the pixels (S16).

19 Claims, 8 Drawing Sheets

(56) References Cited

FOREIGN PATENT DOCUMENTS

| | | | |
|---|---|---|---|
| CN | 104091311 A | 10/2014 |
| CN | 109727216 A | 5/2019 |
| CN | 110992867 A | 4/2020 |
| CN | 111754906 A | 10/2020 |

OTHER PUBLICATIONS

PCT/CN2020/135706 Written Opinion.
Jiang, L. C., G. Q. Shen, and G. X. Zhang. "An image retrieval algorithm based on HSV color segment histograms." Mechanical and Electrical Engineering Magazine 26.11 (2009): 54-57.
CN 202080003313.6 first office action dated Jan. 3, 2025.
CN 202080003313.6 secon office action dated Jul. 7, 2025.

\* cited by examiner

RGB space　　　　HSV space original image          preliminary processed image

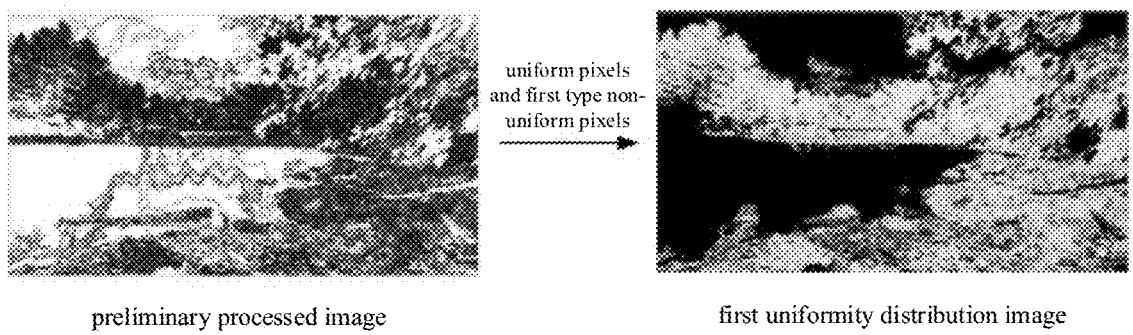

preliminary processed image → uniform pixels and first type non-uniform pixels → first uniformity distribution image

FIG. 12

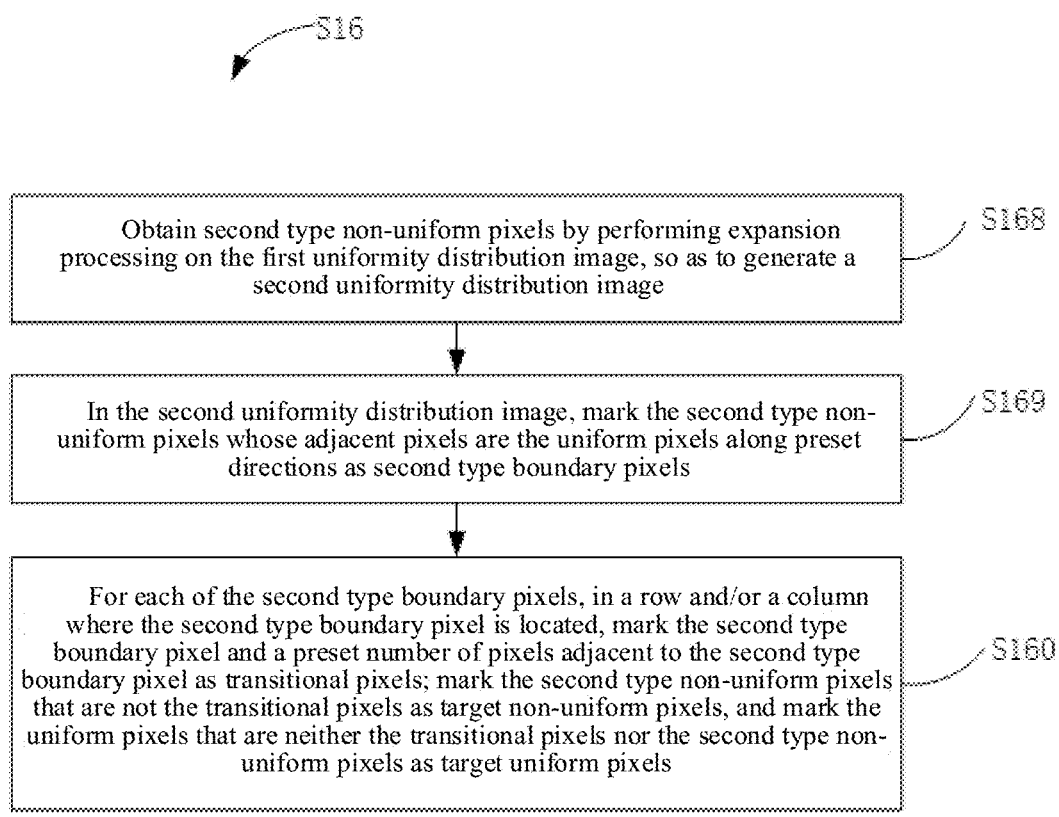

S16

Obtain second type non-uniform pixels by performing expansion processing on the first uniformity distribution image, so as to generate a second uniformity distribution image — S168

In the second uniformity distribution image, mark the second type non-uniform pixels whose adjacent pixels are the uniform pixels along preset directions as second type boundary pixels — S169

For each of the second type boundary pixels, in a row and/or a column where the second type boundary pixel is located, mark the second type boundary pixel and a preset number of pixels adjacent to the second type boundary pixel as transitional pixels; mark the second type non-uniform pixels that are not the transitional pixels as target non-uniform pixels, and mark the uniform pixels that are neither the transitional pixels nor the second type non-uniform pixels as target uniform pixels — S160

FIG.13

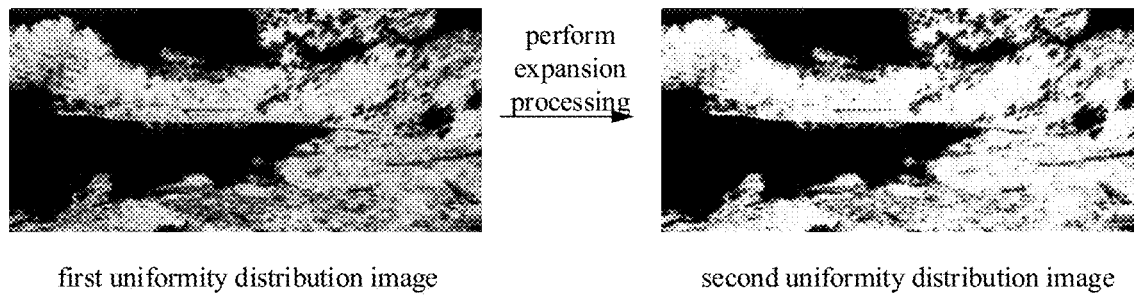

first uniformity distribution image → perform expansion processing → second uniformity distribution image

FIG.14

IMAGE PROCESSING METHODS AND APPARATUSES, ELECTRONIC DEVICES AND STORAGE MEDIA

CROSS-REFERENCE TO RELATED APPLICATIONS

This application is a national stage of international PCT Application No. PCT/CN2020/135706 filed on Dec. 11, 2020, the entire contents of which are incorporated herein by reference.

TECHNICAL FIELD

The present application relates to the field of image processing, and in particular, to an image processing method, an image processing apparatus, an electronic device and a storage medium.

BACKGROUND

In the related art, a small color gamut in which all pixels can be displayed is determined, and all the pixels are corrected to be displayed in the color gamut. By this method, a better uniformity effect can be achieved, but the color gamut loss is large, resulting in a low color saturation of a display image, which cannot truly restore the color.

SUMMARY

In view of this, the present application provides an image processing method, an image processing apparatus, an electronic device and a storage medium.

The image processing method according to embodiments of the present application includes:
  obtaining an original image, and for each of pixels in the original image, converting first color data of the pixel into second color data corresponding to a set color space;
  calculating a feature weighted value of the pixel according to the second color data and a preset rule; and
  determining a uniformity of the pixels based on the feature weighted values to mark the pixels.

In some embodiments, the set color space is an HSV color space.

In some embodiments, the second color data includes hue data, saturation data and brightness data, and calculating the feature weighted value of the pixel according to the second color data and the preset rule includes:
  obtaining third color data by preprocessing the second color data;
  obtaining quantization values corresponding to the hue data, the saturation data and the brightness data by quantizing the third color data based on a color-based segmentation rule; and
  determining the feature weighted value according to the quantization values corresponding to the hue data, the saturation data and the brightness data.

In some embodiments, obtaining the third color data by preprocessing the second color data includes:
  in response to determining that the brightness data of the second color data is less than a first preset value, determining that the second color data is black data; and
  in response to determining that the saturation data of the second color data is less than a second preset value and the brightness data of the second color data is greater than a third preset value, determining that the second color data is white data.

In some embodiments, determining the uniformity of the pixels based on the feature weighted values to mark the pixels includes:
  for each of the pixels, determining a feature difference between the feature weighted value of the pixel and the feature weighted value of an adjacent pixel;
  in response to determining that the feature difference is greater than a first threshold, marking the pixel as a first-type boundary pixel; and
  in response to determining that the feature difference is not greater than the first threshold, marking the pixel as a non-boundary pixel.

In some embodiments, determining the uniformity of the pixels based on the feature weighted values to mark the pixels further includes:
  for each of the first-type boundary pixels, determining a neighborhood of the first-type boundary pixel, and calculating a number of first-type boundary pixels in the neighborhood;
  in response to determining that the number of first-type boundary pixels is greater than a second threshold, marking the first-type boundary pixel as a first-type non-uniform pixel;
  in response to determining that the number of first-type boundary pixels is not greater than a second threshold, marking each of the first-type boundary pixel and the non-boundary pixel as a uniform pixel; and
  generating a first uniformity distribution image based on the first-type non-uniform pixels and the uniform pixels.

In some embodiments, determining the uniformity of the pixels based on the feature weighted values to mark the pixels further includes:
  obtaining second-type non-uniform pixels by performing expansion processing on the first uniformity distribution image, so as to generate a second uniformity distribution image;
  in the second uniformity distribution image, marking the second-type non-uniform pixels whose adjacent pixels are the uniform pixels along preset directions as second-type boundary pixels; and
  for each of the second-type boundary pixels, in a row and/or a column where the second-type boundary pixel is located, marking the second-type boundary pixel and a preset number of pixels adjacent to the second-type boundary pixel as transitional pixels; marking the second-type non-uniform pixels that are not the transitional pixels as target non-uniform pixels, and marking the uniform pixels that are neither the transitional pixels nor the second-type non-uniform pixels as target uniform pixels.

In some embodiments, marking the second-type boundary pixel and the preset number of pixels adjacent to the second-type boundary pixel as transitional pixels includes:
  determining the preset number by randomly selecting a value within a preset range.

In some embodiments, the image processing method further includes:
  determining respective uniformity compensation matrices according to the uniformity of the pixels; and
  obtaining a display image by processing the pixels according to the respective uniformity compensation matrices.

In some embodiments, determining the respective uniformity compensation matrices according to the uniformity of the pixels includes:

respectively obtaining first color gamut conversion matrices corresponding to the target non-uniform pixels, second color gamut conversion matrices corresponding to the transitional pixels and third color gamut conversion matrices corresponding to the target uniform pixels, and obtaining display pixel conversion matrices of light-emitting elements on a display panel corresponding to the pixels, and obtaining the display image by processing the pixels according to the respective uniformity compensation matrices includes:

processing each of the target non-uniform pixels according to the corresponding first color gamut conversion matrix and the corresponding display pixel conversion matrix;

processing each of the transitional pixels according to the corresponding second color gamut conversion matrix and the corresponding display pixel conversion matrix; and processing each of the target uniform pixels according to the corresponding third color gamut conversion matrix and the corresponding display pixel conversion matrix.

In some embodiments, the first color gamut conversion matrices correspond to a first color gamut, the second color gamut conversion matrices correspond to a second color gamut, and the third color gamut conversion matrices correspond to a third color gamut; and a range of the first color gamut is larger than a range of the second color gamut, and a range of the second color gamut is larger than a range of the third color gamut.

In some embodiments, the image processing method further includes:

determining the third color gamut according to a common color gamut range of the light-emitting elements;

determining the second color gamut according to the third color gamut and a first ratio; and determining the first color gamut according to the third color gamut and a second ratio, wherein the second ratio is greater than the first ratio.

In some embodiments, respectively obtaining the first color gamut conversion matrices corresponding to the target non-uniform pixels, the second color gamut conversion matrices corresponding to the transitional pixels and the third color gamut conversion matrices corresponding to the target uniform pixels includes:

determining each of the first color gamut conversion matrices according to chromaticity coordinates and brightness corresponding to three primary colors in the first color gamut;

determining each of the second color gamut conversion matrices according to chromaticity coordinates and brightness corresponding to the three primary colors in the second color gamut; and determining each of the third color gamut conversion matrices according to chromaticity coordinates and brightness corresponding to the three primary colors in the third color gamut.

In some embodiments, obtaining the display pixel conversion matrices of the light-emitting elements in the display panel corresponding to the pixels includes:

for each of the light-emitting elements in the display panel corresponding to the pixels, determining the corresponding display pixel conversion matrix according to RGB color data of the light-emitting element.

The image processing apparatus according to the embodiments of the present application includes:

an obtaining module, configured to obtain an original image, and for each of pixels in the original image, convert first color data of the pixel into second color data corresponding to a set color space;

a calculating module, configured to calculate a feature weighted value of the pixel according to the second color data and a preset rule; and a determining module, configured to determine a uniformity of the pixels based on the feature weighted values to mark the pixels.

The embodiments of the present application further provides an electronic device, including:

one or more processors, and a memory; and one or more programs, wherein the one or more programs are stored in the memory and executed by the one or more processors, and the one or more programs include instructions for executing the image processing method described in any one of the above embodiments.

The embodiments of the present application further provide a nonvolatile computer-readable storage medium of a computer program, wherein when the computer program is executed by one or more processors, the processors are caused to execute the image processing method described in any one of the above embodiments.

In the image processing method, the image processing apparatus, the electronic device and the computer storage medium of the embodiments of the present application, first color data of an obtained original image is converted into second color data corresponding a set color space, and feature weighted values of pixels are calculated according to the second color data and a preset rule, so that a uniformity of the pixels are determined by the feature weighted values, and thus the pixels in the image can be marked according to the uniformity of the pixels. In this way, it can be decided whether to reduce the uniformity of certain areas to improve the color gamut according to the uniformity of image content, so that different uniformity compensation matrices are configured for each pixel, and the color saturation of the image is increased on the basis of ensuring the overall uniformity to improve the image quality, thus enhancing the user experience.

Additional aspects and advantages of the present application will be set forth in part in the following description, and in part will be obvious from the following description, or may be learned by practice of the present application.

BRIEF DESCRIPTION OF THE DRAWINGS

The foregoing and/or additional aspects and advantages of the present application will be apparent and easily understood from the following description of embodiments taken in conjunction with the accompanying drawings, in which:

FIG. 12 is another schematic diagram illustrating a scenario for a method of processing an image according to some embodiments of the present application.

FIG. 13 is a flowchart illustrating a method of processing an image according to some embodiments of the present application.

FIG. 14 is another schematic diagram illustrating a scenario for a method of processing an image according to some embodiments of the present application.

Figure 1:
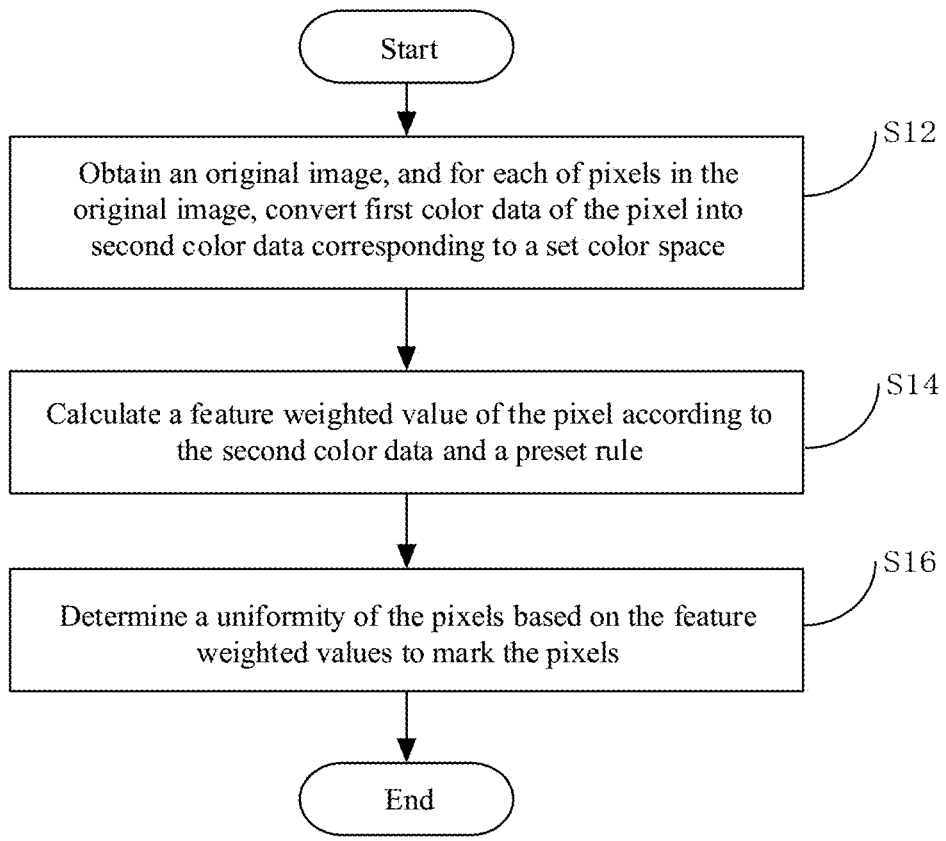
FIG. 1 is a flowchart illustrating a method of processing an image according to some embodiments of the present application.

SYMBOL DESCRIPTION OF MAIN ELEMENTS an image processing apparatus 10, an obtaining module 12, a calculating module 14, a determining module 16, a processing module 18, an electronic device 100, a processor 20, a memory 30, a program 32, a storage medium 40, a computer program 42, an LED display screen 50.

DETAILED DESCRIPTION OF THE EMBODIMENTS

Embodiments of the present application will be described in detail, and examples of the embodiments are illustrated in the accompanying drawings. Elements with the same or similar reference numerals indicate the same or similar elements or elements having the same or similar functions throughout. The embodiments described herein with reference to the accompanying drawings are exemplary and are intended to explain the present application, but not to be construed as limitations of the present application.

Generally, an LED display screen is formed by assembling a plurality of LEDs, which have different photoelectric parameters. When the plurality of LEDs are assembled into a whole display screen to play pictures, there are often non-uniform phenomenon such as light spot, mosaic and blurred picture. The uniformity of the chromaticity and brightness of the LED is an important factor that affects the viewing effect, and is also the most difficult factor to control, which seriously hinders the development of LED display screen industry. At present, for the adjustment of chromaticity, a bin screening method is generally used to reduce the chromaticity difference between pixels. However, since the chromaticity and brightness of LEDs produced by different manufacturers or the same manufacturer in different periods may be greatly different, and meanwhile, it is necessary to ensure that the LEDs used to assemble one large-area LED display screen belong to the same batch, which increases the cost. In addition, even for the same batch of LEDs, the drift speed and the brightness decay speed of the wavelength center are different, which exacerbates the no-uniformity of the chromaticity and brightness of a full-color LED display screen and brings more difficulties to correct the uniformity of the chromaticity and brightness.

In the related art, because an LED is a pixel/pixel point in the LED display technology, by determining a small color gamut in which all pixels can be displayed, all the pixels in the LED display screen can be corrected to be displayed in the color gamut of the LED. By this method, a better uniformity effect can be achieved, but the color gamut loss is large. Thus, when the LED display screen displays an image, the color saturation is low, and the color distortion of the image is serious.

Referring to FIG. 1, the present application provides an image processing method, which includes the steps S12-S16.

S12, an original image is obtained, and for each of pixels in the original image, first color data of the pixel is converted into second color data corresponding to a set color space.

S14, a feature weighted value of the pixel is calculated according to the second color data and a preset rule.

S16, a uniformity of the pixels are determined based on the feature weighted values to mark the pixels.

Figure 2:
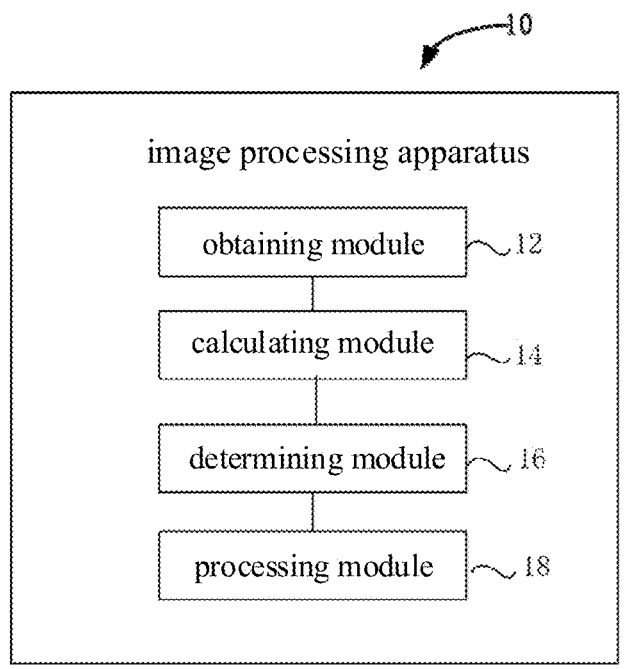
FIG. 2 is a schematic block diagram illustrating an apparatus of processing an image according to some embodiments of the present application.

Referring to FIG. 2, the embodiments of the present application further provide an image processing apparatus 10. The image processing apparatus 10 includes an obtaining module 12, a calculating module 14 and a determining module 16.

S12 may be implemented by the obtaining module 12, S14 may be implemented by the calculating module 14, and S16 may be implemented by the determining module 16.

In other words, the obtaining module 12 may be configured to obtain an original image, and for each of pixels in the original image, convert first color data of the pixel into second color data corresponding to a set color space.

The calculating module 14 may be configured to calculate a feature weighted value of the pixel according to the second color data and a preset rule.

The determining module 16 may be configured to determine a uniformity of the pixels based on the feature weighted values to mark the pixels.

Figure 3:
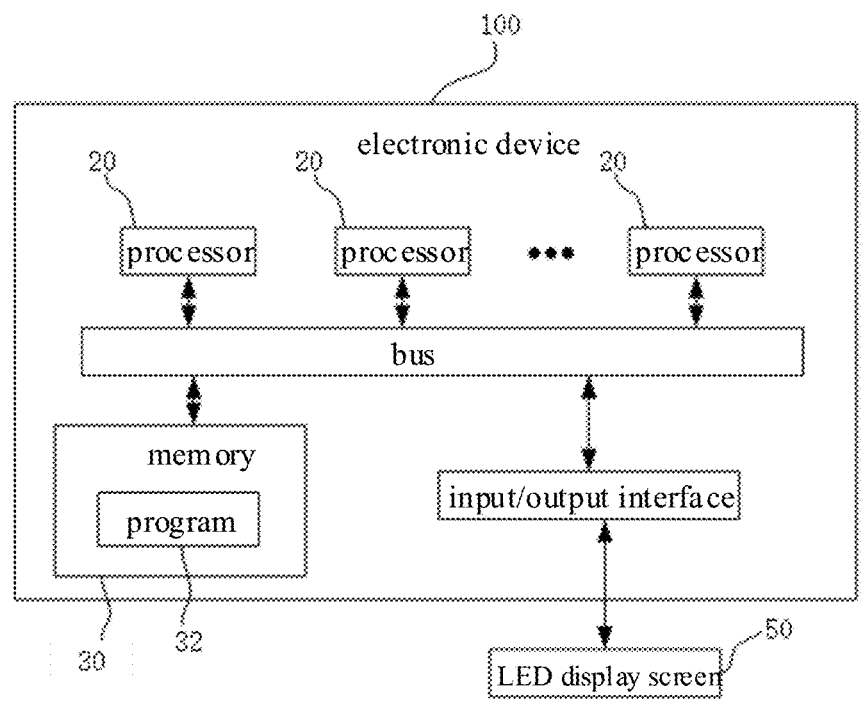
FIG. 3 is a schematic block diagram illustrating an electronic device according to some embodiments of the present application.

Referring to FIG. 3, the embodiments of the present application further provide an electronic device 100 including one or more processors 20, a memory 30 and one or more programs 32. The one or more programs 32 are stored in the memory 30 and executed by the one or more processors 20, and the one or more programs 32 include instructions for the processor 20 to execute the above image processing method.

Figure 4:
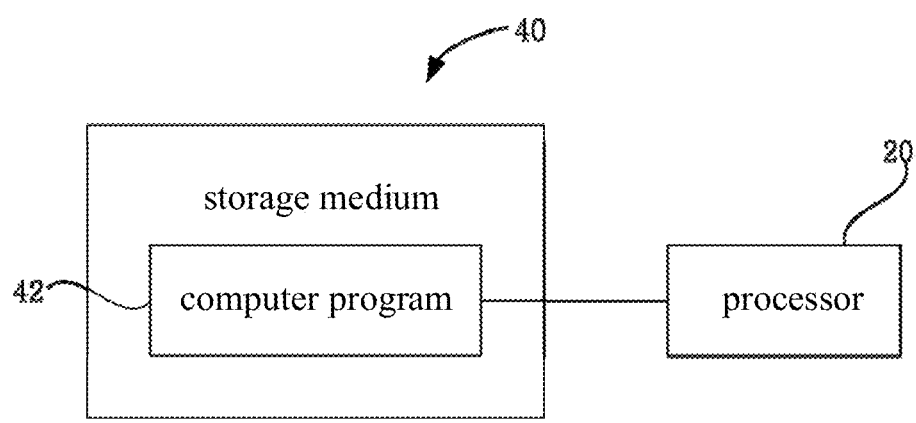
FIG. 4 is a schematic block diagram illustrating a storage medium connected with a processor according to some embodiments of the present application.

Referring to FIG. 4, the embodiments of the present application further provide a nonvolatile computer-readable storage medium 40 having a computer program 42 stored thereon. The computer program 42, when executed by the one or more processors 20, causes the one or more processors 20 to execute the above image processing method.

In the image processing method, the image processing apparatus 10, the electronic device 100 and the storage medium 40 of the embodiments of the present application, first color data of an obtained original image is converted into second color data corresponding a set color space, and feature weighted values of pixels are calculated according to the second color data and a preset rule, so that a uniformity of the pixels are determined by the feature weighted values, and thus the pixels in the image can be marked according to the uniformity of the pixels. In this way, it can be decided whether to reduce the uniformity of certain areas to improve the color gamut according to the image content, so that different uniformity compensation matrices are configured for each pixel, and the color saturation is increased on the basis of ensuring the overall uniformity to improve the image quality, thus enhancing the user experience.

In some embodiments, the electronic device 100 may be a television, a computer, a mobile phone, a tablet, or a smart wearable device such as an electronic watch, a VR device, an AR device or the like. The electronic device 100 includes an LED display screen 50 including but not limited to an OLED display screen, a Mini-LED display screen or a Micro-LED display screen. For example, in the present application, the LED display screen 50 may be a Mini-LED display screen.

In some embodiments, the image processing apparatus 10 may be a part of the electronic device 100. In other words, the electronic device 100 includes the image processing apparatus 10.

In some embodiments, the image processing apparatus 10 may be a discrete component that is assembled in a certain manner to have the aforementioned functions, or a chip with the aforementioned functions in the form of an integrated circuit, or a computer software code segment that enables a computer to have the aforementioned functions when running on the computer.

In some embodiments, as hardware, the image processing apparatus 10 may be independent or added to a computer or computer system as an additional peripheral component. The image processing apparatus 10 may also be integrated into a computer or computer system. For example, when the image processing apparatus 10 is a part of the electronic device 100, the image processing apparatus 10 may be integrated into the processor 20.

In some embodiments in which the image processing apparatus 10 is a part of the electronic device 100, as software, the code segments corresponding to the image processing apparatus 10 may be stored in the memory 30 and executed by the processor 20 to implement the aforementioned functions. In other words, the image processing apparatus 10 includes the above one or more programs 32, or the above one or more programs 32 include the image processing apparatus 10.

In some embodiments, the computer-readable storage medium 40 may be a storage medium built in the electronic device 100, for example, may be the memory 30, or a storage medium that may be removably inserted into the electronic device 100, such as an SD card.

Figure 5:
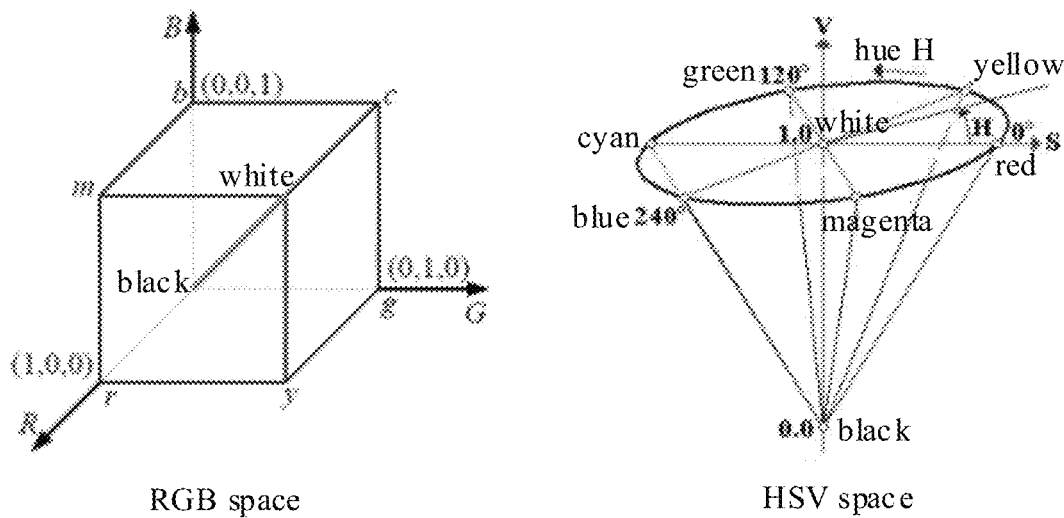
FIG. 5 is a schematic diagram illustrating an RGB color space and an HSV color space according to some embodiments of the present application.

Referring to FIG. 5, it should be noted that the RGB mode is a common physical color mode of the LED display screen 50, that is, an image is generally displayed on a display device in the RGB mode, and the display image is used for displaying in the electronic device 100. Therefore, the first color data may be RGB color data. That is, the first color data of a pixel in the original image is RGB color data. RGB is designed based on the principle of color luminescence, and RGB includes three color channels of red, green and blue. The brightness level for each color may be divided into 256 levels of brightness. At a level of 0, the "light" is the weakest—it is turned off, and at a level of 255, the "light" is the brightest. When the gray levels of the three colors are the same, gray hues with different gray levels are generated. That is, when the gray levels of the three colors are all 0, it is the darkest black hue, and when the gray levels of the three colors are all 255, it is the brightest white hue. An RGB value refers to brightness and is expressed by an integer. Generally, R, G and B each have 256 levels of brightness, which are expressed by numbers as 0, 1, 2 . . . 254, 255.

It should also be noted that each pixel involves a set of first color data, that is, if the first color data is RGB color data, a pixel involves a set of RGB color data.

In other embodiments, if the physical color mode of the LED display screen 50 is RGBW mode, the first color data may also be RGBW color data.

It can be understood by those skilled in the related art that a color space, also called a color model (also called a colour space or a colour system), is used to account for colors in a generally acceptable manner under certain standards. The color space includes RGB color space, CMY color space, HSV color space, HSI color space or the like. Understandably, the set color space refers to a predefined color space. In the present application, it is necessary to convert a color image into an image with only a few colors. Therefore, by converting the first color data into the second color data corresponding to the set color space, the data processing for the colors of the pixel can be better implemented.

Further referring to FIG. 5, in the present application, the set color space is an HSV color space. That is, in the present application, for each of pixels in the original image, converting first color data of the pixel into second color data corresponding to a set color space means: for each of pixels in the original image, converting RGB color data of the pixel into HSV color data.

The HSV color space is a color space proposed for better digital processing of color, which is also called Hexcone Model. The HSV color space is defined with hue (H), saturation (S) and value (V).

The hue H is measured by angle, and a value of the hue H is between 0 and 360 degrees. The value of the hue H is calculated from red in a counterclockwise direction, where red represents 0 degrees, green represents 120 degrees and blue represents 240 degrees. For their complementary colors, yellow represents 60 degrees, cyan represents 180 degrees and magenta represents 300 degrees.

The saturation S indicates the degree to which a color is close to a spectral color. A color may be regarded as the result of mixing a certain spectral color with white. The greater the proportion of the spectral color, the closer the color is to the spectral color and the higher the saturation of the color. The saturation is high, and the color is deep and bright. The white light component of the spectral color is 0, and the saturation reaches the highest. Generally, a value of the saturation S is in a range of 0% to 100%, and the larger the value, the more saturated the color is.

The value V indicates the degree of the brightness of a color. For a color of a light source, a value of the V is related to the light brightness of the luminous body, and for a color of an object, a value of the V is related to the transmittance ration or reflectance ration of the object. Generally, a value of the V is in a range of 0% (black) to 100% (white).

The conversion formula for converting RGB color data into HSV color data is as follows:

$$V = \max(R, G, B)$$

$$S = \begin{cases} \dfrac{V - \min(R, G, B)}{V}, & \text{if } (V \neq 0) \\ 0, & \text{others} \end{cases}$$

$$H = \begin{cases} \left(\dfrac{60(G - B)}{V - \min(R, G, B)}\right), & \text{if } (V = R) \\ 120 + \dfrac{60(B - R)}{V - \min(R, G, B)}, & \text{if } (V = G) \\ 240 + \dfrac{60(R - G)}{V - \min(R, G, B)}, & \text{if } (V = B) \end{cases}$$

In this way, through the above formula, the first color data of each pixel in the image data can be converted into the second color data corresponding to the set color space, that is, the RGB color data can be converted into the HSV color data.

Understandably, since it is difficult to determine the color represented by the RGB value, the RGB color space does not conform to the user's perception psychology of color. Secondly, the RGB color space is a non-uniform color space, and the perceptual difference between two colors cannot be expressed by the distance between two color points in this color space. In the HSV color space, the value V component is not related to the color information of the image, while the hue H and saturation S components are related to the color information of the image, so that the HSV color space is suitable for perceiving color characteristics with the users' visual system. Therefore, by converting the RGB color data into the HSV color data, users can intuitively perceive color characteristics.

It is also noted that the feature weighted value refers to a one-dimensional vector value obtained by performing quantization and dimension reduction processing on the second color data.

The preset rule refers to a rule defined in advance, which is used to performing quantization and dimension reduction processing on HSV color data of the pixels in the image to obtain the feature weighted values. The preset rule may be stored in the memory 30 and called by the processor 20 when processing the HSV color data, so as to generate the feature weighted values.

Furthermore, after the HSV color data is quantized based on the preset rule to obtain the feature weighted values, the uniformity detection can be performed on the pixels in the image based on the feature weighted values, and the uniformity of the pixels in the image can be determined, so that the pixels can be marked according to the uniformity of the pixels. In this way, it can be determined whether the uniformity of certain areas should be reduced to improve the color gamut, so that different uniformity compensation matrices can be subsequently configured for each pixel to improve the color saturation on the basis of ensuring the overall uniformity.

Figure 6:
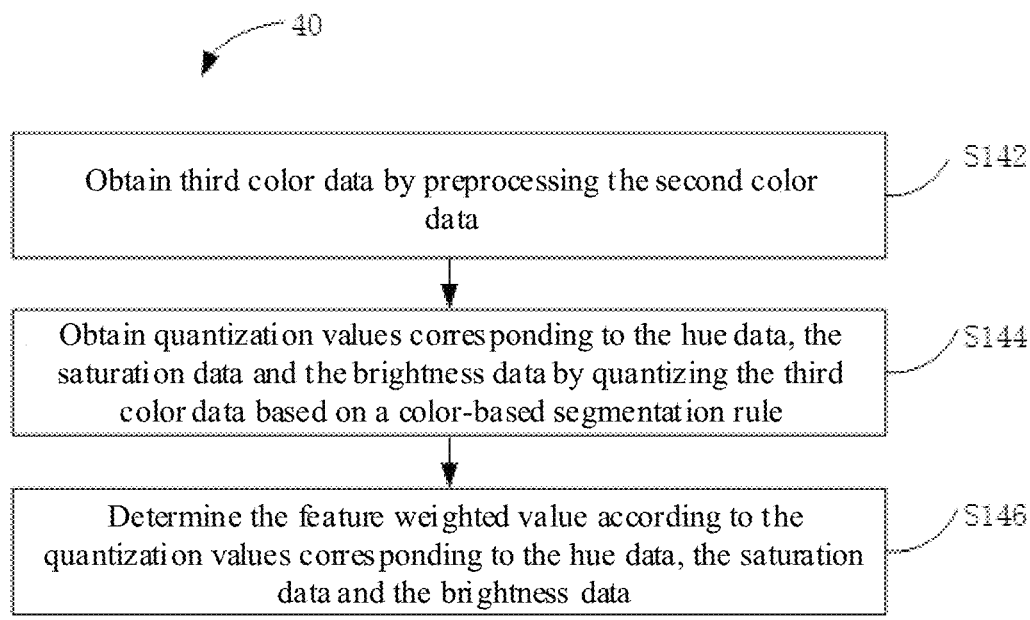
FIG. 6 is a flowchart illustrating a method of processing an image according to some embodiments of the present application.
Figure 7:
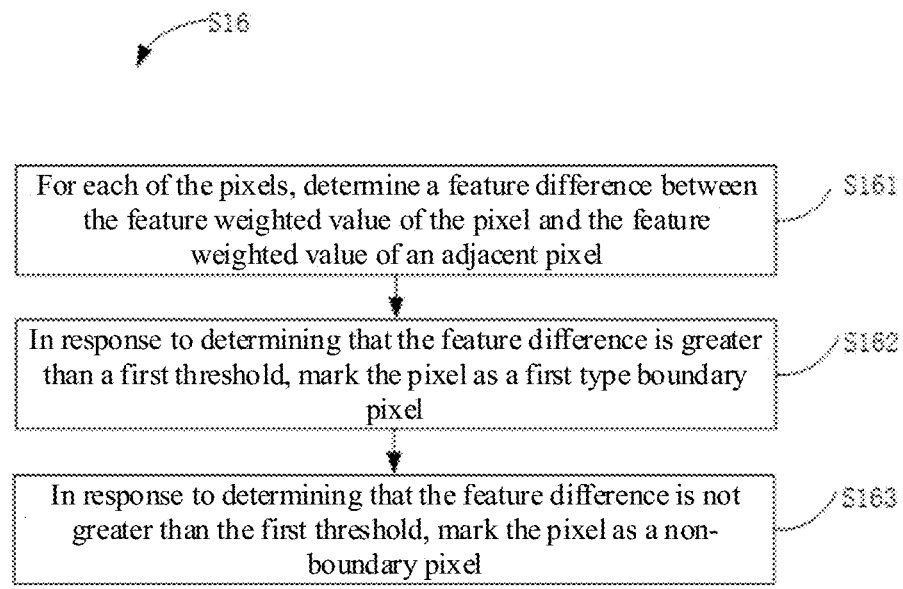
FIG. 7 is a flowchart illustrating a method of processing an image according to some embodiments of the present application.

Referring to FIG. 6, in some embodiments, step S14 includes the sub-steps S142-S146.

S142, third color data is obtained by preprocessing the second color data.

S144, quantization values corresponding to the hue data, the saturation data and the brightness data are obtained by quantizing the third color data based on a color-based segmentation rule.

S146, the feature weighted value is determined according to the quantization values corresponding to the hue data, the saturation data and the brightness data.

Further referring to FIG. 2, in some embodiments, steps S142, S144 and S146 may be implemented by the computing module 14. In other words, the calculating module 14 may be configured to obtain third color data by preprocessing the second color data. The calculating module 14 may further be configured to obtain quantization values corresponding to the hue data, the saturation data and the brightness data by quantizing the third color data based on a color-based segmentation rule, and determine the feature weighted value according to the quantization values corresponding to the hue data, the saturation data and the brightness data.

Further referring to FIG. 3, in some embodiments, the processor 20 may be configured to obtain third color data by preprocessing the second color data. The processor 20 may further be configured to obtain quantization values corresponding to the hue data, the saturation data and the brightness data by quantizing the third color data based on a color-based segmentation rule, and determine the feature weighted value according to the quantization values corresponding to the hue data, the saturation data and the brightness data.

An image, especially a true color image, generally involves many colors, and the calculation amount in the subsequent processing is large, which easily leads to the decreased accuracy of the color model. Therefore, the processor 20 may preprocess the second color data first, so that a color close to black is used as black, and a color close to white is used as white, thereby finally obtaining the third color data. In this way, the number of colors of the image is reduced, the calculation amount in the subsequent processing is reduced and the accuracy of the color model is improved.

In some embodiments, the processor 20 is preset with a first preset value, a second preset value and a third preset value. After the processor 20 obtains the HSV color data of each pixel, the processor 20 may further obtain brightness data V and saturation data S from each piece of HSV color data, compare the brightness data V with the first preset value and the third preset value respectively, and compare the saturation data S with the second preset value. If the brightness data V is less than the first preset value, the HSV color data of this pixel is mapped to black data (H=0, S=0, V=0); if the saturation data S is less than the second preset value and the brightness data V is greater than the third preset value, the HSV color data is mapped to white data (H=0, S=0, V=1), and the HSV color data of other pixels remain unchanged, thus obtaining the third color data corresponding to the set color space.

In some examples, the first preset value is 0.15, the second preset value is 0.1, the third preset value is 0.8, the first HSV color data is (30, 0.1, 0.1), and the second HSV color data is (60, 0.05, 0.9), then the first HSV color data is mapped to black data (0, 0, 0), and the second HSV color data (60, 0.05, 0.9) is mapped to white data (0, 0, 1).

Further, according to the perceptual characteristics of human vision to color, the processor 20 performs unequal-interval quantization on the three components of the HSV color data of the pixel in the image, namely hue data H, saturation data S and brightness data V according to the color-based segmentation rule, to obtain quantization values corresponding to the hue data, the saturation data and the brightness data. The processing formula of the color-based segmentation rule is as follows:

$$H = \begin{cases} 0, & H \in [316, 20] \\ 1, & H \in [21, 40] \\ 2, & H \in [41, 75] \\ 3, & H \in [76, 155] \\ 4, & H \in [156, 190] \\ 5, & H \in [191, 270] \\ 6, & H \in [271, 295] \\ 7, & H \in [296, 315] \end{cases}$$

$$S = \begin{cases} 0, & S \in [0, 0.2) \\ 1, & S \in [0.2, 0.7) \\ 2, & S \in [0.7, 1] \end{cases}$$

$$V = \begin{cases} 0, & V \in [0, 0.2) \\ 1, & V \in [0.2, 0.7) \\ 2, & V \in [0.7, 1] \end{cases}$$

In this way, according to the above formula, the quantization values corresponding to the three components of the hue data H, the saturation data S and the brightness data V of each pixel can be obtained. Furthermore, the quantization values corresponding to the hue data, the saturation data and the brightness data are constructed to generate a feature weighted value G of a one-dimensional feature vector. The construction formula is as follows:

$$G = HQ_S Q_V + SQ_V + V.$$

where, $Q_S$ represents a quantization level of the saturation, and $Q_V$ represents a quantization level of the brightness data. In the above embodiments, $Q_S=3$, $Q_V=3$, that is, in the present application, the feature weighted value is $G=9H+3S+V$. In this way, the uniformity of the pixels in the image can be obtained according to the feature weighted values.

Figure 11:
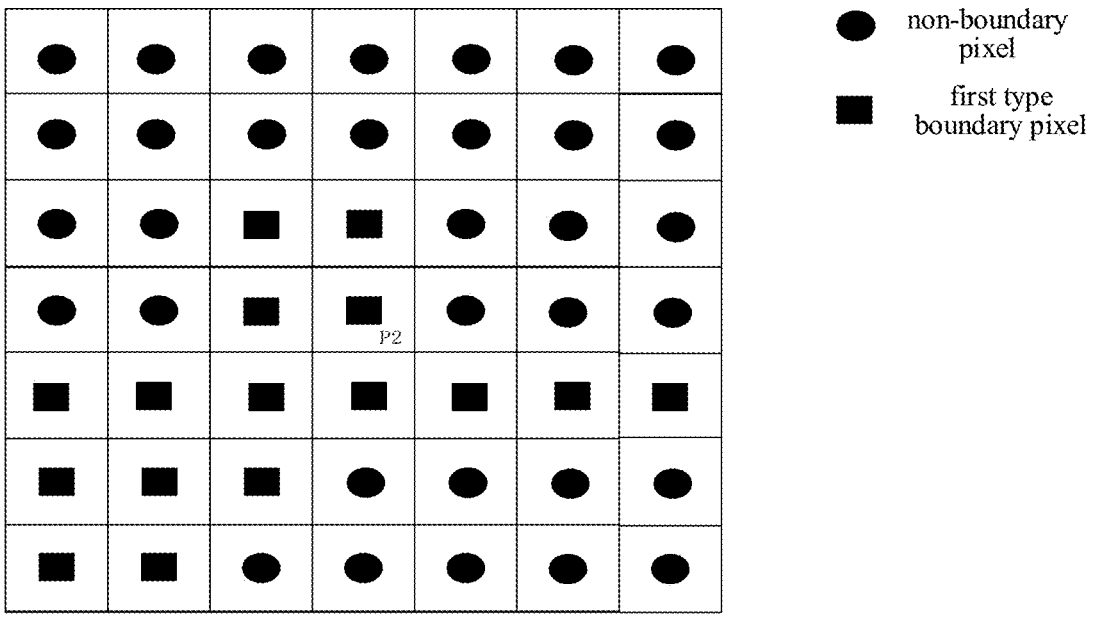
FIG. 11 is a schematic diagram illustrating a neighborhood scenario for a method of processing an image according to some embodiments of the present application.

Referring to FIG. 11, in some embodiments, step S16 includes the sub-steps S161-S163.

S161, for each of the pixels, a feature difference between the feature weighted value of the pixel and the feature weighted value of an adjacent pixel is determined.

S162, in response to determining that the feature difference is greater than a first threshold, the pixel is marked as a first-type boundary pixel.

S163, in response to determining that the feature difference is not greater than the first threshold, the pixel is marked as a non-boundary pixel.

In some embodiments, the sub-steps S161, S162 and S163 may be implemented by the determining module 16. In other words, the determining module 16 may be configured to for each of the pixels, determine a feature difference between the feature weighted value of the pixel and the feature weighted value of an adjacent pixel. The determining module 16 may further be configured to mark the pixel as a first-type boundary pixel in response to determining that the feature difference is greater than a first threshold, and mark the pixel as a non-boundary pixel in response to determining that the feature difference is not greater than the first threshold.

In some embodiments, the processor 20 may be configured to for each of the pixels, determine a feature difference between the feature weighted value of the pixel and the feature weighted value of an adjacent pixel. The processor 20 may further be configured to mark the pixel as a first-type boundary pixel in response to determining that the feature difference is greater than a first threshold, and mark the pixel as a non-boundary pixel in response to determining that the feature difference is not greater than the first threshold.

It should be noted that the first threshold refers to a value preset by the processor 20. The value of the first threshold may be 1, 2, 3, 4, 5 or greater, etc., and the specific value of the first threshold is not limited.

Figure 8:
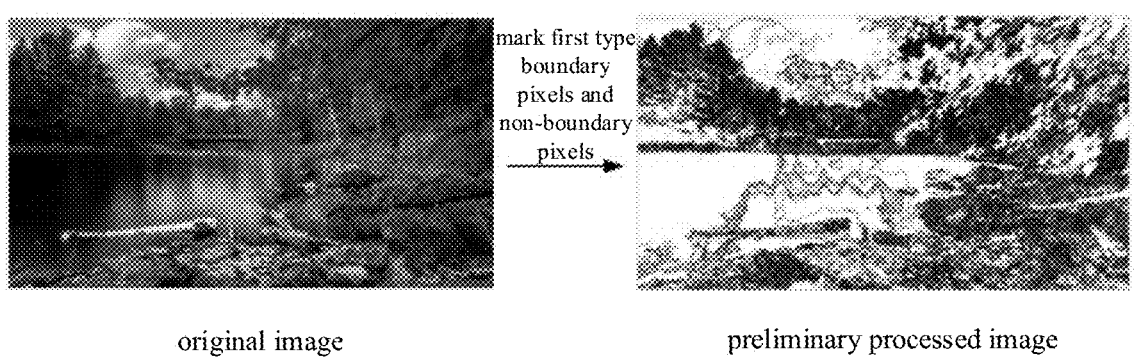
FIG. 8 is a schematic diagram illustrating a scenario for a method of processing an image according to some embodiments of the present application.

Please refer to FIG. 8. In some embodiments, the processor 20 may traverse the feature weighted value of each pixel in the image, and compare the feature weighted values between adjacent pixels to obtain the feature difference between the adjacent pixels, and then compare the feature difference with the first threshold. In response to determining that the feature difference between the current pixel and the adjacent pixel is greater than the first threshold, the current pixel may be marked as the first-type boundary pixel. In response to determining that the feature difference between the current pixel and the adjacent pixel is less than or equal to the first threshold, the current pixel may be marked as the non-boundary pixel, so that a preliminary processed image can be obtained according to the first-type boundary pixels and the non-boundary pixels. It should be noted that in the preliminary processed image as shown in FIG. 8, the black marked area represents the first-type boundary pixels, and the white marked area represents the non-boundary pixels.

Figure 9:
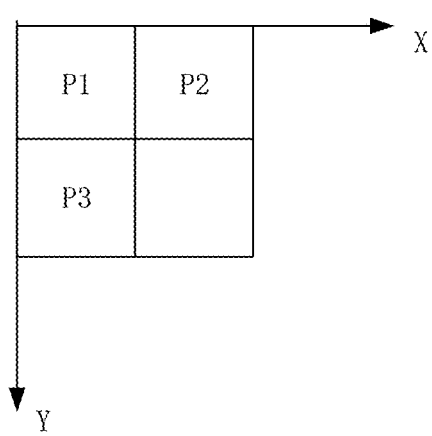
FIG. 9 is another schematic diagram illustrating a scenario for a method of processing an image according to some embodiments of the present application.

Please refer to FIG. 9. For example, in some examples, the coordinate of the current pixel is P1 (i, j), and the coordinates of adjacent pixels are P2 (i+1, j) and P3 (i, j+1). If the difference between the feature weighted value of the current pixel P1 and the feature weighted value of one of the pixels P2 and P3 exceeds the first threshold, P1 may be marked as the first-type boundary pixel, otherwise, P1 may be marked as the non-boundary pixel.

Figure 10:
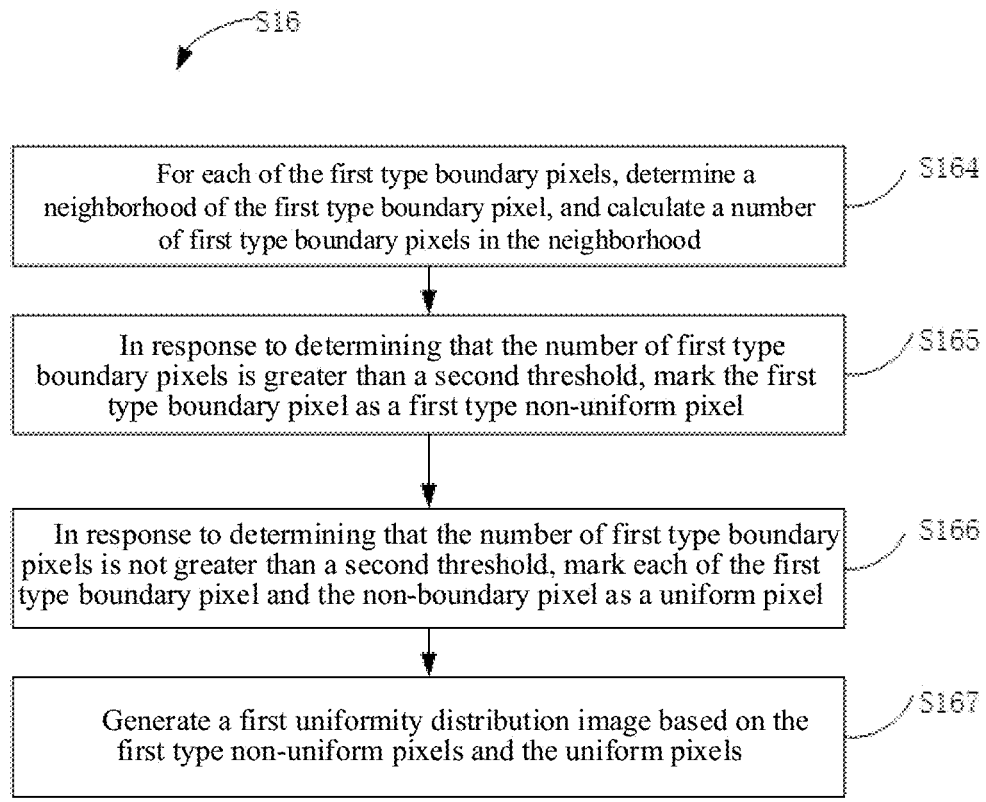
FIG. 10 is a flowchart illustrating a method of processing an image according to some embodiments of the present application.

Referring to FIG. 10, in some embodiments, step S16 further includes the sub-steps S164-S167.

S164, for each of the first-type boundary pixels, a neighborhood of the first-type boundary pixel is determined, and a number of first-type boundary pixels in the neighborhood is calculated.

S165, in response to determining that the number of first-type boundary pixels is greater than a second threshold, the first-type boundary pixel is marked as a first-type non-uniform pixel.

S166, in response to determining that the number of first-type boundary pixels is not greater than a second threshold, each of the first-type boundary pixel and the non-boundary pixel is marked as a uniform pixel.

S167, a first uniformity distribution image is generated based on the first-type non-uniform pixels and the uniform pixels.

Please further refer to FIG. 2. In some embodiments, steps S164, S165, S166 and S167 may be implemented by the determining module 16.

In other words, the determining module 16 may be configured to for each of the first-type boundary pixels, determine a neighborhood of the first-type boundary pixel, and calculate a number of first-type boundary pixels in the neighborhood. The determining module 16 may be configured to in response to determining that the number of first-type boundary pixels is greater than a second threshold, mark the first-type boundary pixel as a first-type non-uniform pixel. The determining module 16 may further be configured to in response to determining that the number of first-type boundary pixels is not greater than a second threshold, mark each of the first-type boundary pixel and the non-boundary pixel as a uniform pixel, and generate a first uniformity distribution image based on the first-type non-uniform pixels and the uniform pixels.

In some embodiments, the processor 20 may be configured to for each of the first-type boundary pixels, determine a neighborhood of the first-type boundary pixel, and calculate a number of first-type boundary pixels in the neighborhood. The processor 20 may be configured to in response to determining that the number of first-type boundary pixels is greater than a second threshold, mark the first-type boundary pixel as a first-type non-uniform pixel. The processor 20 may further be configured to in response to determining that the number of first-type boundary pixels is not greater than a second threshold, mark each of the first-type boundary pixel and the non-boundary pixel as a uniform pixel, and generate a first uniformity distribution image based on the first-type non-uniform pixels and the uniform pixels.

It should be noted that the neighborhood refers to a basic topological structure in the set, and the neighborhood corresponding to the first-type boundary pixel refers to an interval with a preset range centered on the first-type boundary pixel, and the range of the neighborhood may be adjusted and set.

The second threshold refers to a positive integer preset by the processor 20 for comparison with the number of the first-type boundary pixels. The value of the second threshold may be 5, 8, 10, 12 or even 20 or more. There is no limit to the specific value of the second threshold.

For example, the second threshold may be 8. Please refer to FIG. 11, where the square represents the first-type boundary pixels, and the circle represents the non-boundary pixels. For the first-type boundary pixel P2, by taking the first-type boundary pixel P2 as the center and taking 7*7 pixels around the center as a square to determine the neighborhood range of P2. In this case, the number of first-type boundary pixels in the neighborhood range of the first-type boundary pixel P2 is 15. That is, the number of the first-type boundary pixels in the neighborhood range of the first-type boundary pixel P2 is greater than the second threshold, and the first-type boundary pixel P2 is marked as the first-type non-uniform pixel. Accordingly, in the case that the number of first-type boundary pixels within the neighborhood range of the first-type boundary pixel P2 is not greater than the second threshold, the first-type boundary pixel P2 may be marked as the uniform pixel. In this way, all the first-type boundary pixels in the preliminary processed image are traversed in turn, and the first-type boundary pixels and the non-boundary pixels may be classified to obtain the first-type non-uniform pixels and the uniform pixels.

It should be noted that in step S164, the neighborhood of the first-type boundary pixel is obtained on the basis of the preliminary processed image, thus the first-type non-uniform pixels or the uniform pixels marked in steps S165 and S166 will not affect the marking of other first-type boundary pixels.

Please refer to FIG. 12. In this way, after determining the first-type non-uniform pixels and the uniform pixels in the pixels in the image, the preliminarily processed image may be generated into the first uniformity distribution image. It should be noted that in the first uniformity distribution image as shown in FIG. 12, the black marked areas represent uniform pixels, and the white marked areas represent first-type non-uniform pixels.

Referring to FIG. 13, in some embodiments, step S16 further includes the sub-steps S168-S160.

S168, second-type non-uniform pixels are obtained by performing expansion processing on the first uniformity distribution image, so as to generate a second uniformity distribution image.

S169, in the second uniformity distribution image, the second-type non-uniform pixels whose adjacent pixels are the uniform pixels along preset directions are marked as second-type boundary pixels.

S160, for each of the second-type boundary pixels, in a row and/or a column where the second-type boundary pixel is located, the second-type boundary pixel and a preset number of pixels adjacent to the second-type boundary pixel are marked as transitional pixels; the second-type non-uniform pixels that are not the transitional pixels are marked as target non-uniform pixels, and the uniform pixels that are neither the transitional pixels nor the second-type non-uniform pixels are marked as target uniform pixels.

Please further refer to FIG. 2. In some embodiments, steps S168, S169 and S160 are implemented by the determining module 16.

In other words, the determining module 16 may be configured to obtain second-type non-uniform pixels by performing expansion processing on the first uniformity distribution image, so as to generate a second uniformity distribution image; and in the second uniformity distribution image, the second-type non-uniform pixels whose adjacent pixels are the uniform pixels along preset directions are marked as second-type boundary pixels. The determining module 16 may further be configured to for each of the second-type boundary pixels, in a row and/or a column where the second-type boundary pixel is located, mark the second-type boundary pixel and a preset number of pixels adjacent to the second-type boundary pixel as transitional pixels; mark the second-type non-uniform pixels that are not the transitional pixels as target non-uniform pixels, and mark the uniform pixels that are neither the transitional pixels nor the second-type non-uniform pixels as target uniform pixels.

In some embodiments, the processor 20 may be configured to obtain second-type non-uniform pixels by performing expansion processing on the first uniformity distribution image, so as to generate a second uniformity distribution image; and in the second uniformity distribution image, the second-type non-uniform pixels whose adjacent pixels are the uniform pixels along preset directions are marked as second-type boundary pixels. The processor 20 may further be configured to for each of the second-type boundary pixels, in a row and/or a column where the second-type boundary pixel is located, mark the second-type boundary pixel and a preset number of pixels adjacent to the second-type boundary pixel as transitional pixels; mark the second-type non-uniform pixels that are not the transitional pixels as target non-uniform pixels, and mark the uniform pixels that are neither the transitional pixels nor the second-type non-uniform pixels as target uniform pixels.

In some embodiments, please refer to FIG. 14. There are many discrete first-type non-uniform pixels (discrete pixels) in the distribution area of uniform pixels in the first uniformity distribution image, and the discrete pixels have an impact on the uniformity of the image. Therefore, the expansion processing may be performed on the first uniformity distribution image, so as to obtain a second uniformity distribution image in which the area of non-uniform pixels and the area of uniform pixels are obvious.

It should be noted that the expansion processing refers to the expansion (domain expansion) of the highlighted part in the image, so that the effect image has a larger highlighted area than the original image. In the present application, after performing expansion processing on the uniform pixels in the first uniformity distribution image, the discrete first-type non-uniform pixels and partial uniform pixels may be transformed into second-type non-uniform pixels, and a second uniformity distribution image may be generated.

In some embodiments, after obtaining the second uniformity distribution image, the processor 20 may traverse the second uniformity distribution image, and if an adjacent pixel to the right or below of the second-type non-uniform pixel is a uniform pixel, it is determined that the second-type non-uniform pixel is the second-type boundary pixel.

In some embodiments, for each of the second-type boundary pixels, in a row where the second-type boundary pixel is located, the second-type boundary pixel and a preset number of pixels adjacent to the second-type boundary pixel are marked as transitional pixels; the second-type non-uniform pixels that are not the transitional pixels are marked as target non-uniform pixels, and the uniform pixels that are neither the transitional pixels nor the second-type non-uniform pixels are marked as target uniform pixels.

In other embodiments, for each of the second-type boundary pixels, in a column where the second-type boundary pixel is located, the second-type boundary pixel and a preset number of pixels adjacent to the second-type boundary pixel are marked as transitional pixels; the second-type non-uniform pixels that are not the transitional pixels are marked as target non-uniform pixels, and the uniform pixels that are neither the transitional pixels nor the second-type non-uniform pixels are marked as target uniform pixels.

In other embodiments, for each of the second-type boundary pixels, in a row and a column where the second-type boundary pixel is located, the second-type boundary pixel and a preset number of pixels adjacent to the second-type boundary pixel are marked as transitional pixels; the second-type non-uniform pixels that are not the transitional pixels are marked as target non-uniform pixels, and the uniform pixels that are neither the transitional pixels nor the second-type non-uniform pixels are marked as target uniform pixels.

When the second-type boundary pixel and a preset number of pixels adjacent to the second-type boundary pixel are marked as transitional pixels, the preset number of pixels adjacent to the second-type boundary pixel, whether they are the second-type non-uniform pixels or the uniform pixels, are marked as the transitional pixels.

In addition, it should be noted that the preset number may be a positive integer randomly selected within a preset range. For example, if the preset range is [1, 10], the preset number may be any one of ten positive integer from 1 to 10.

In this way, the unnatural boundary transition between the uniform pixel area and the non-uniform pixel area may be weakened. Moreover, because the distribution of pixels in the original image corresponds to that in the second uniformity distribution image, the pixels in the original image may also be marked as target uniform pixels, target non-uniform pixels and transitional pixels. Randomly selecting the preset number from the preset range may also reduce the problem that the transition area is obvious.

Figure 15:
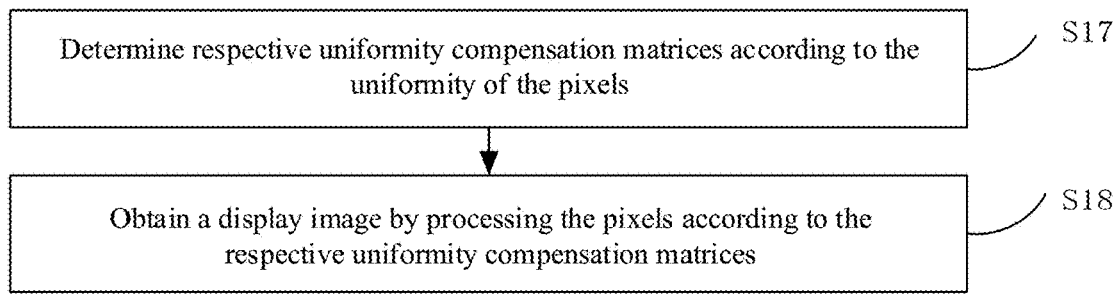
FIG. 15 is a flowchart illustrating a method of processing an image according to some embodiments of the present application.

Referring to FIG. 15, in some embodiments, the image processing method further includes the steps S17-S18.

S17, respective uniformity compensation matrices are determined according to the uniformity of the pixels.

S18, a display image is obtained by processing the pixels according to the respective uniformity compensation matrices.

Further referring to FIG. 2, in some embodiments, the image processing apparatus further includes a processing module 18. Step S17 and step S18 may be implemented by the processing module 18.

In other words, the processing module 18 may be configured to determine respective uniformity compensation matrices according to the uniformity of the pixels.

The processing module 18 may be configured to obtain a display image by processing the pixels according to the respective uniformity compensation matrices.

In some embodiments, the processor 20 may be configured to determine respective uniformity compensation matrices according to the uniformity of the pixels. The processor 20 may further be configured to obtain a display image by processing the pixels according to the respective uniformity compensation matrices.

It should be noted that the uniformity compensation matrix is a conversion matrix, which is used to process the RGB color data of the pixel in the original image, thus generating a display image.

There may be a plurality of uniformity compensation matrices, and the plurality of uniformity compensation matrices may respectively process the target uniform pixels, the target non-uniform pixels and the transitional pixels in the original image, so as to obtain the display image. It can be understood that the second uniformity distribution image obtained after the above processing includes three types of pixels, namely, the target uniform pixels, the target non-uniform pixels and the transitional pixels, that is, the second uniformity distribution image is divided into three types of distribution areas. The second uniformity distribution image is generated by processing the original image, and the pixels in the second uniformity distribution image correspond to the pixels in the original image. Thus, according to the pixel uniformity classification of the second uniformity distribution image, the corresponding pixels in the original image are processed by different uniformity compensation matrices (gamut mapping) to obtain the display image. In this way, the color saturation and the visual effect of the display image can be improved on the basis of ensuring the overall uniformity.

Figure 16:
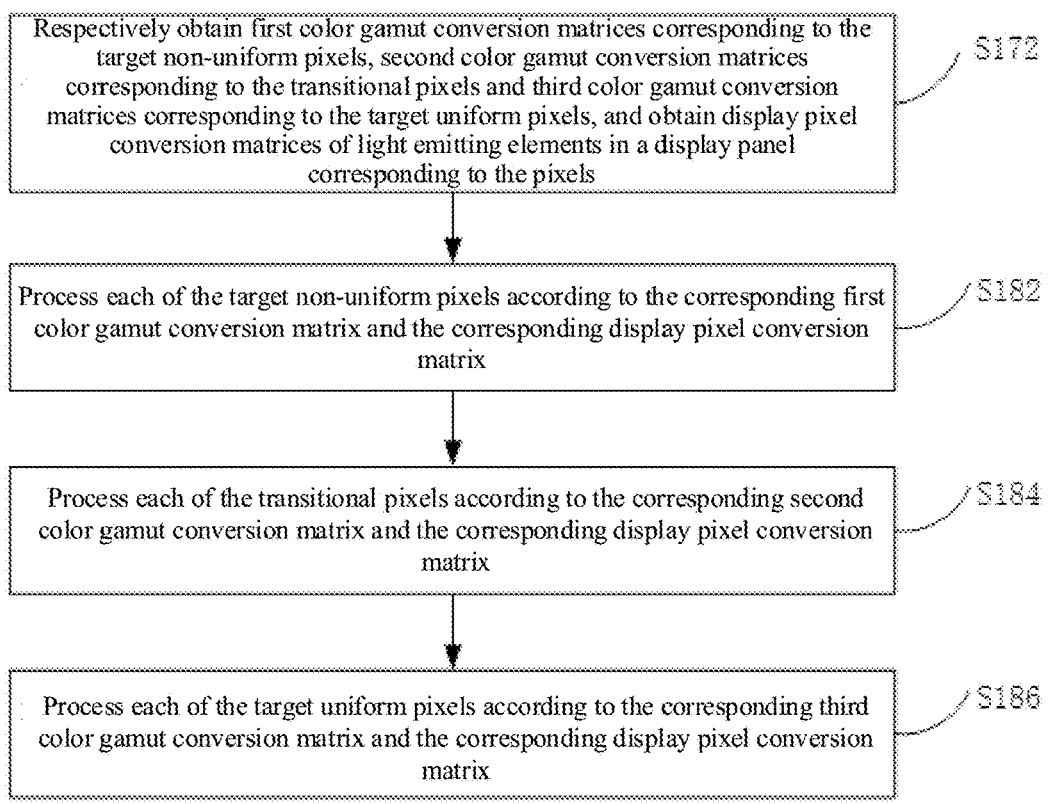
FIG. 16 is a flowchart illustrating a method of processing an image according to some embodiments of the present application.

Please refer to FIG. 16. In some embodiments, step S17 further includes the sub-step S172.

S172, first color gamut conversion matrices corresponding to the target non-uniform pixels, second color gamut conversion matrices corresponding to the transitional pixels and third color gamut conversion matrices corresponding to the target uniform pixels are obtained respectively, and display pixel conversion matrices of light-emitting elements in a display panel corresponding to the pixels are obtained.

S18 further includes the sub-steps S182-S186.

S182, each of the target non-uniform pixels is processed according to the corresponding first color gamut conversion matrix and the corresponding display pixel conversion matrix.

S184, each of the transitional pixels is processed according to the corresponding second color gamut conversion matrix and the corresponding display pixel conversion matrix.

S186, each of the target uniform pixels is processed according to the corresponding third color gamut conversion matrix and the corresponding display pixel conversion matrix.

In some embodiments, the sub-steps S172, S182, S184 and S186 may be implemented by the processing module 18.

In other words, the processing module 18 may be configured to respectively obtain first color gamut conversion matrices corresponding to the target non-uniform pixels, second color gamut conversion matrices corresponding to the transitional pixels and third color gamut conversion matrices corresponding to the target uniform pixels, and obtain display pixel conversion matrices of light-emitting elements in a display panel corresponding to the pixels.

The processing module 18 may be further configured to process each of the target non-uniform pixels according to the corresponding first color gamut conversion matrix and the corresponding display pixel conversion matrix, or process each of the transitional pixels according to the corresponding second color gamut conversion matrix and the corresponding display pixel conversion matrix. The processing module 18 may further be configured to process each of the target uniform pixels according to the corresponding third color gamut conversion matrix and the corresponding display pixel conversion matrix.

In some embodiments, the processor 20 may be configured to respectively obtain first color gamut conversion matrices corresponding to the target non-uniform pixels, second color gamut conversion matrices corresponding to the transitional pixels and third color gamut conversion matrices corresponding to the target uniform pixels, and obtain display pixel conversion matrices of light-emitting elements in a display panel corresponding to the pixels. The processor 20 may further be configured to process each of the target non-uniform pixels according to the corresponding first color gamut conversion matrix and the corresponding display pixel conversion matrix, or process each of the transitional pixels according to the corresponding second color gamut conversion matrix and the corresponding display pixel conversion matrix. The processor 20 may further be configured to process each of the target uniform pixels according to the corresponding first third color gamut conversion matrix and the corresponding display pixel conversion matrix.

It should be noted that the first color gamut is a color gamut corresponding to the target non-uniform pixels, the second color gamut is a color gamut corresponding to the transitional pixels, and the third color gamut is a color gamut corresponding to the target uniform pixels.

In some embodiments, the uniformity compensation matrices include the first color gamut conversion matrices, the second color gamut conversion matrices, the third color gamut conversion matrices and the display pixel conversion matrices. The first color gamut conversion matrices correspond to a first color gamut, the second color gamut conversion matrices correspond to a second color gamut, and the third color gamut conversion matrices correspond to a third color gamut. A range of the first color gamut is larger than a range of the second color gamut, and a range of the second color gamut is larger than a range of the third color gamut. The first color gamut, the second color gamut and the third color gamut all belong to the display color gamut.

The first color gamut conversion matrix is used to convert the RGB color data of the target non-uniform pixel from the input color space to the first color gamut space, that is, to convert the RGB color data of the target non-uniform pixel into the first color gamut. The second color gamut conversion matrix is used to convert the RGB color data of the transitional pixel from the input color space to the second color gamut space, that is, to convert the RGB color data of the transitional pixel into the second color gamut. The third color gamut conversion matrix is used to convert the RGB color data of the target uniform pixel from the input color space to the third color gamut space, that is, to convert the RGB color data of the target uniform pixel into the third color gamut.

In some embodiments, the processor may determine the first color gamut conversion matrix according to chromaticity coordinates and brightness corresponding to three primary colors in the first color gamut, determine the second color gamut conversion matrix according to chromaticity coordinates and brightness corresponding to the three primary colors in the second color gamut, and determine the third color gamut conversion matrix according to chromaticity coordinates and brightness corresponding to the three primary colors in the third color gamut.

The formula for the first color gamut conversion matrix is as follows:

$$C_1 \times \begin{bmatrix} R_{in} \\ G_{in} \\ B_{in} \end{bmatrix} = \begin{bmatrix} X \\ Y \\ Z \end{bmatrix}$$

where, $C_1$ represents a large color gamut conversion matrix, ($R_{in}$, $G_{in}$, $B_{in}$) represents input RGB color data, and (X, Y, Z) represents first color gamut color data.

The formula for the second color gamut conversion matrix is as follows:

$$C_2 \times \begin{bmatrix} R_{in} \\ G_{in} \\ B_{in} \end{bmatrix} = \begin{bmatrix} X \\ Y \\ Z \end{bmatrix}$$

where, $C_2$ represents a transition color gamut conversion matrix, ($R_{in}$, $G_{in}$, $B_{in}$) represents input RGB color data, and (X, Y, Z) represents second color gamut color data.

The formula for the third color gamut conversion matrix is as follows:

$$C_3 \times \begin{bmatrix} R_{in} \\ G_{in} \\ B_{in} \end{bmatrix} = \begin{bmatrix} X \\ Y \\ Z \end{bmatrix}$$

where, $C_3$ represents a small color gamut conversion matrix, ($R_{in}$, $G_{in}$, $B_{in}$) represents input RGB color data, and (X, Y, Z) represents third color gamut color data.

The display pixel conversion matrix is used to convert the input RGB color data from the first color gamut space, the second color gamut space or the third color gamut space to the display color gamut space. Understandably, the first color data of the original image is the RGB color data, thus the input color space is the RGB color space. Accordingly, the display image should also be displayed on the LED display screen 50, so the display color gamut space is also the RGB color space.

In some embodiments, for each of the light-emitting elements in the display panel corresponding to the pixels, the corresponding display pixel conversion matrix is determined according to RGB color data of the light-emitting element. The RGB color data of the light-emitting element in the display panel may be a chromaticity coordinate and brightness of the light-emitting element.

The formula for the display pixel conversion matrix is as follows:

$$C_{xianshi}^{-1} \times \begin{bmatrix} X \\ Y \\ Z \end{bmatrix} = \begin{bmatrix} R_{out} \\ G_{out} \\ B_{out} \end{bmatrix}$$

where, $C_{xianshi}^{-1}$ represents an inverse transformation matrix of the display color gamut, ($R_{out}$, $G_{out}$, $B_{out}$) represents display color data, and (X, Y, Z) represents color gamut color data.

It should be noted that the conversion matrix $C_{xianshi}$ of the display color gamut is as follows:

$$\begin{bmatrix} \frac{x_{r0}}{y_{r0}} Y_{r0} & \frac{x_{g0}}{y_{g0}} Y_{g0} & \frac{x_{b0}}{y_{b0}} Y_{b0} \\ Y_{r0} & Y_{g0} & Y_{b0} \\ \frac{1-x_{r0}-x_{r0}}{y_{r0}} Y_{r0} & \frac{1-x_{g0}-x_{g0}}{y_{g0}} Y_{g0} & \frac{1-x_{b0}-x_{b0}}{y_{b0}} Y_{b0} \end{bmatrix}$$

where, the chromaticity coordinate of R in the RGB color data of a pixel is $(x_{r0}, y_{r0})$, and the brightness is $Y_{r0}$; the chromaticity coordinate of B in the RGB color data of a pixel is $(x_{g0}, y_{g0})$, and the brightness is $Y_{r0}$; and the chromaticity coordinate of G in the RGB color data of a pixel is $(x_{b0}, y_{b0})$, and the brightness is $Y_{b0}$.

The calculation formula of $C_1$, $C_2$, and $C_3$ is as follows:

$$\begin{bmatrix} \frac{x_{ri}}{y_{ri}} Y_{ri}, & \frac{x_{gi}}{y_{gi}} Y_{gi}, & \frac{x_{bi}}{y_{bi}} Y_{bi} \\ Y_{ri}, & Y_{gi}, & Y_{bi} \\ \frac{1-x_{ri}-x_{ri}}{y_{ri}} Y_{ri}, & \frac{1-x_{gi}-x_{gi}}{y_{gi}} Y_{gi}, & \frac{1-x_{bi}-x_{bi}}{y_{bi}} Y_{bi} \end{bmatrix}$$

where, i is 1, 2 or 3, the chromaticity coordinate of R corresponding to the three primary colors in a corresponding color gamut is $(x_{ri}, y_{ri})$, and the brightness is $Y_{ri}$; the chromaticity coordinate of B in the RGB color data of the pixel is $(x_{gi}, y_{gi})$, and the brightness is $Y_{gi}$; and the chromaticity coordinate of G in the RGB color data of the pixel is $(x_{bi}, y_{bi})$, and the brightness is $Y_{bi}$.

For example, when i=1, that is, the first color gamut conversion matrix $C_1$ is as follows:

$$\begin{bmatrix} \frac{x_{r1}}{y_{r1}} Y_{r1} & \frac{x_{g1}}{y_{g1}} Y_{g1} & \frac{x_{b1}}{y_{b1}} Y_{b1} \\ Y_{r1} & Y_{g1} & Y_{b1} \\ \frac{1-x_{r1}-x_{r1}}{y_{r1}} Y_{r1} & \frac{1-x_{g1}-x_{g1}}{y_{g1}} Y_{g1} & \frac{1-x_{b1}-x_{b1}}{y_{b1}} Y_{b1} \end{bmatrix}$$

where, the chromaticity coordinate of R corresponding to the three primary colors in a corresponding color gamut is $(x_{r1}, Y_{r1})$, and the brightness is $Y_{r1}$; the chromaticity coordinate of B corresponding to the three primary colors of the first color gamut is $(x_{g1}, y_{g1})$, and the brightness is $Y_{g1}$; and the chromaticity coordinate of G in the RGB color data of the pixel is $(x_{b1}, y_{b1})$, and the brightness is $Y_{b1}$.

In this way, the uniformity of certain areas may be reduced and the color gamut can be improved by the uniformity compensation matrices, so that different uniformity compensation matrices may be configured for each pixel. Thus, the color saturation can be improved on the basis of ensuring the overall uniformity. For example, the processor 20 may obtain the first color gamut conversion matrices and the display pixel conversion matrices, and process the target non-uniform pixels according to the first color gamut conversion matrices and the display pixel conversion matrices to obtain a display image. For another example, the processor 20 may obtain the second color gamut conversion matrices and the display pixel conversion matrices, and process the transitional pixels according to the second color gamut conversion matrices and the display pixel conversion matrices to obtain a display image. Or, the processor 20 may obtain the third color gamut conversion matrices and display pixel conversion matrices, and process the target uniform pixels according to the third color gamut conversion matrices and the display pixel conversion matrices to obtain a display image.

In some embodiments, after different color gamut mapping, the hue of the image remains unchanged, only the saturation changes, and white point correction can be performed for the large color gamut, the small color gamut and the transition color gamut respectively. The white point correction method is as follows:

$$\begin{bmatrix} X_r & X_g & X_b \\ Y_r & Y_g & Y_b \\ Z_r & Z_g & Z_b \end{bmatrix} \times \begin{bmatrix} k_r \cdot 1 \\ k_g \cdot 1 \\ k_b \cdot 1 \end{bmatrix} = \begin{bmatrix} X_w \\ Y_w \\ Z_w \end{bmatrix} \Rightarrow \begin{bmatrix} k_r \\ k_g \\ k_b \end{bmatrix} = \begin{bmatrix} X_r & X_g & X_b \\ Y_r & Y_g & Y_b \\ Z_r & Z_g & Z_b \end{bmatrix}^{-1} \times \begin{bmatrix} X_w \\ Y_w \\ Z_w \end{bmatrix}$$

The 3*3 matrix of the above formula is a gamut conversion matrix without white point correction, and the $X_W$, $Y_W$, and $Z_W$ of the standard white point are known, so the correction coefficient can be calculated. The conversion matrix after white point correction is as follows:

$$\begin{bmatrix} X_r \cdot k_r & X_g \cdot k_g & X_b \cdot k_b \\ Y_r \cdot k_r & Y_g \cdot k_g & Y_b \cdot k_b \\ Z_r \cdot k_r & Z_g \cdot k_g & Z_b \cdot k_b \end{bmatrix}$$

Figure 17:
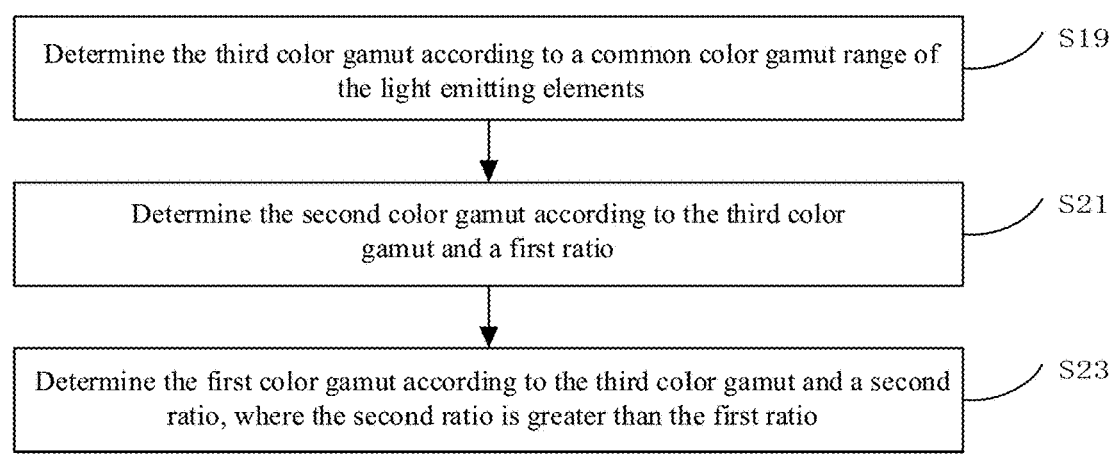
FIG. 17 is a flowchart illustrating a method of processing an image according to some embodiments of the present application.

Please refer to FIG. 17. In some embodiments, the image processing method further includes the steps S19-S23.

S19, the third color gamut is determined according to a common color gamut range of the light-emitting elements.

S21, the second color gamut is determined according to the third color gamut and a first ratio.

S23, the first color gamut is determined according to the third color gamut and a second ratio, where the second ratio is greater than the first ratio.

In some embodiments, steps S19, S21 and S23 may be implemented by the processing module 18.

In other words, the processing module 18 is configured to determine the third color gamut according to a common color gamut range of the light-emitting elements.

The processing module 18 is configured to determine the second color gamut according to the third color gamut and a first ratio.

The processing module 18 may further be configured to determine the first color gamut according to the third color gamut and a second ratio, where the second ratio is greater than the first ratio.

In some embodiments, the processor 20 is configured to determine the third color gamut according to a common color gamut range of the light-emitting elements. The processor 20 is configured to determine the second color gamut according to the third color gamut and a first ratio. The processor 20 may further be configured to determine the first color gamut according to the third color gamut and a second ratio, where the second ratio is greater than the first ratio.

It should be noted that light-emitting elements refer to pixels/pixel points in the LED display screen, and it should be noted that each light-emitting element is used to display any value representing R color data, G color data and B color data in RGB color data. It can be understood that there may be differences in brightness and chromaticity between the light-emitting elements in each LED display screen 50, which will lead to deviations when different LED display screens 50 display the same image. Therefore, it is necessary to detect according to the light-emitting elements in the LED display screen 50, so as to determine the ranges of the first color gamut, the second color gamut and the third color gamut.

Figure 18:
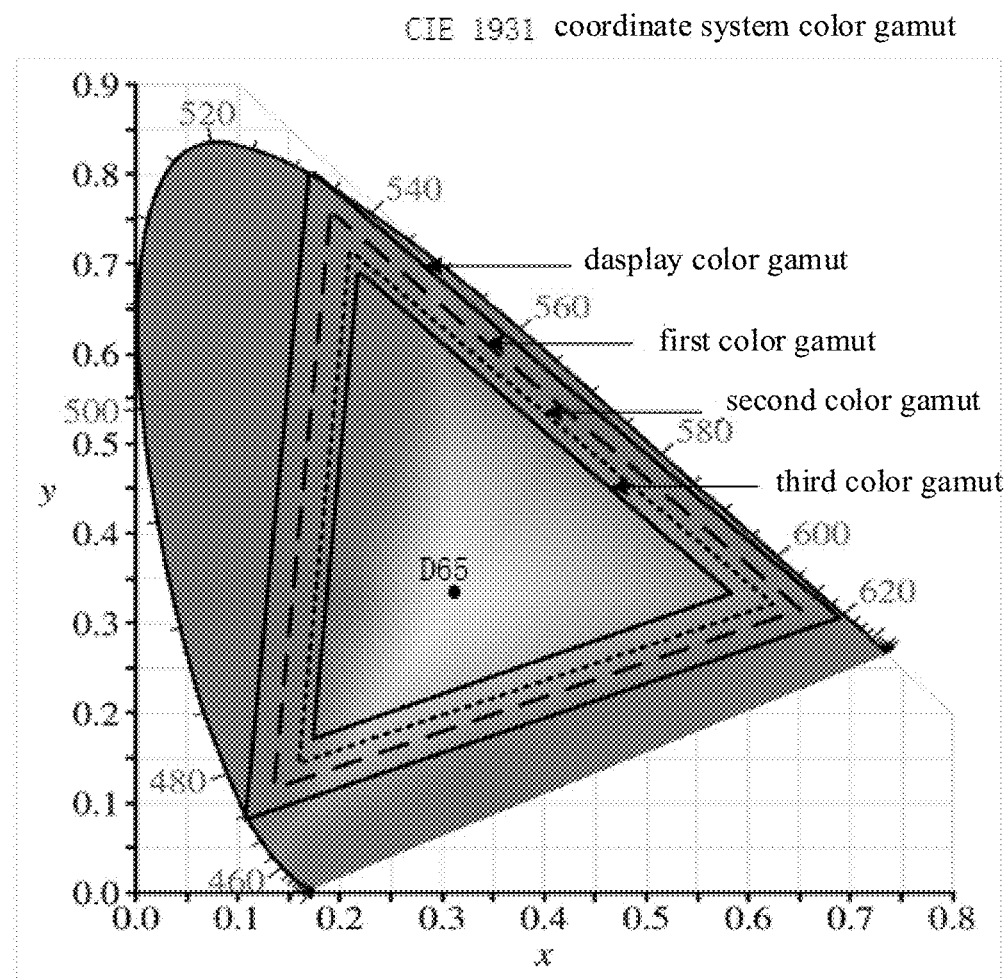
FIG. 18 is a schematic diagram illustrating a color gamut in a method of processing an image according to some embodiments of the present application.

Referring to FIG. 18, in some embodiments, the processor 20 may input a solid color image to the LED display screen 50, so that the LED display screen 50 can display the solid color image. The processor 20 may detect the chromaticity coordinate (x, y) and the brightness value of each light-emitting element under the D65 color standard, and determine the brightness of each light-emitting element displaying R color data, the brightness of each light-emitting element displaying G color data, and the brightness of each light-emitting element displaying B color data.

In some embodiments, the processor 20 may compare the brightness of all light-emitting elements displaying R color data to obtain a first target light-emitting element displaying R color data with the smallest brightness value, compare the brightness of all light-emitting elements displaying G color data to obtain a second target light-emitting element displaying G color data with the smallest brightness value, and compare the brightness of all light-emitting elements displaying B color data to obtain a third target light-emitting element displaying B color data with the smallest brightness value. Further, the processor 20 may determine the chromaticity coordinates of the first target light-emitting element, the second target light-emitting element and the third target light-emitting element. Finally, the processor 20 may obtain a color gamut triangle according to lines connecting the chromaticity coordinates of the first target light-emitting element, the second target light-emitting element and the third target light-emitting element, and set an area of the color gamut triangle as a third color gamut.

In addition, the processor 20 is further provided with the first ratio and the second ratio, where the first ratio and the second ratio are greater than 1 and the second ratio is greater than the first ratio, for example, the first ratio may be 1.2 and the second ratio may be 1.4. The processor 20 may connect the chromaticity coordinate of D65 white point with the chromaticity coordinates of the first target light-emitting element, the second target light-emitting element and the third target light-emitting element respectively to obtain a first connection line, a second connection line and a third connection line. Further, the processor 20 may obtain a first chromaticity coordinate, a second chromaticity coordinate and a third chromaticity coordinate by extending the first connection line, the second connection line and the third connection line according to the first ratio along the directions of the first connection line, the second connection line and the third connection line, and connect the first chromaticity coordinate, the second chromaticity coordinate and the third chromaticity coordinate in sequence to obtain a new color gamut triangle, then set an area of the color gamut triangle as a second color gamut.

In other embodiments, the processor 20 may obtain a fourth chromaticity coordinate, a fifth chromaticity coordinate and a sixth chromaticity coordinate by extending the first connection line, the second connection line and the third connection line according to the second ratio along the directions of the first connection line, the second connection line and the third connection line, and connect the fourth chromaticity coordinate, the fifth chromaticity coordinate and the sixth chromaticity coordinate in sequence to obtain a new color gamut triangle, and set an area of the color gamut triangle as a third color gamut.

In this way, ranges of the first color gamut, the second color gamut and the third color gamut are obtained.

In several embodiments provided by the present application, it should be understood that the disclosed systems, apparatuses and methods may be implemented in other manners. For example, the apparatus embodiments described above are merely exemplary. For example, the division of the units is merely logical function division, and may be other division in actual implementation, such as multiple units or components may be combined or integrated into another system, or some features may be ignored or not executed. In addition, the mutual coupling or direct coupling or communication connection shown or discussed may be indirect coupling or communication connection through some interfaces, apparatuses or units, which may be electrical, mechanical or other forms.

In addition, functional units in each embodiment of the present application may be integrated into one processing unit, or each unit may exist physically alone, or two or more units may be integrated into one unit.

The foregoing descriptions are merely specific embodiments of the present application, but are not intended to limit the protection scope of the present application. Any variation or replacement readily figured out by a person skilled in the art within the technical scope disclosed in the present application shall belong to the protection scope of the present application. Therefore, the protection scope of the present application shall be subject to the protection scope of the claims.

The invention claimed is:

1. A method of processing an image, comprising:
obtaining an original image, and for each of pixels in the original image,
converting first color data of the pixel into second color data corresponding to a set color space;
calculating a feature weighted value of the pixel according to the second color data and a preset rule; and
determining a uniformity of the pixels based on the feature weighted values to mark the pixels;
wherein determining the uniformity of the pixels based on the feature weighted values to mark the pixels comprises:
for each of the pixels, determining a feature difference between the feature weighted value of the pixel and the feature weighted value of an adjacent pixel;
in response to determining that the feature difference is greater than a first threshold, marking the pixel as a first-type boundary pixel; and
in response to determining that the feature difference is not greater than the first threshold, marking the pixel as a non-boundary pixel.

2. The method according to claim 1, wherein the set color space is an HSV color space.

3. The method according to claim 2, wherein the second color data comprises hue data, saturation data and brightness data, and
calculating the feature weighted value of the pixel according to the second color data and the preset rule comprises:
obtaining third color data by preprocessing the second color data;
obtaining quantization values corresponding to the hue data, the saturation data and the brightness data by quantizing the third color data based on a color-based segmentation rule; and
determining the feature weighted value according to the quantization values corresponding to the hue data, the saturation data and the brightness data.

4. The method according to claim 3, wherein obtaining the third color data by preprocessing the second color data comprises:
in response to determining that the brightness data of the second color data is less than a first preset value, determining that the second color data is black data; and
in response to determining that the saturation data of the second color data is less than a second preset value and the brightness data of the second color data is greater than a third preset value, determining that the second color data is white data.

5. The method according to claim 1, wherein determining the uniformity of the pixels based on the feature weighted values to mark the pixels further comprises:
for each of the first-type boundary pixels,
determining a neighborhood of the first-type boundary pixel, and calculating a number of first-type boundary pixels in the neighborhood;
in response to determining that the number of first-type boundary pixels is greater than a second threshold, marking the first-type boundary pixel as a first-type non-uniform pixel;
in response to determining that the number of first-type boundary pixels is not greater than a second threshold, marking each of the first-type boundary pixel and the non-boundary pixel as a uniform pixel; and
generating a first uniformity distribution image based on the first-type non-uniform pixels and the uniform pixels.

6. The method according to claim 5, wherein determining the uniformity of the pixels based on the feature weighted values to mark the pixels further comprises:
obtaining second-type non-uniform pixels by performing expansion processing on the first uniformity distribution image, so as to generate a second uniformity distribution image;
in the second uniformity distribution image, marking the second-type non-uniform pixels whose adjacent pixels are the uniform pixels along preset directions as second-type boundary pixels; and
for each of the second-type boundary pixels, in a row and/or a column where the second-type boundary pixel is located, marking the second-type boundary pixel and a preset number of pixels adjacent to the second-type boundary pixel as transitional pixels; marking the second-type non-uniform pixels that are not the transitional pixels as target non-uniform pixels, and marking the uniform pixels that are neither the transitional pixels nor the second-type non-uniform pixels as target uniform pixels.

7. The method according to claim 6, wherein marking the second-type boundary pixel and the preset number of pixels adjacent to the second-type boundary pixel as transitional pixels comprises:
determining the preset number by randomly selecting a value within a preset range.

8. The method according to claim 6, further comprising:
determining respective uniformity compensation matrices according to the uniformity of the pixels; and
obtaining a display image by processing the pixels according to the respective uniformity compensation matrices.

9. The method according to claim 8, wherein determining the respective uniformity compensation matrices according to the uniformity of the pixels comprises:
respectively obtaining first color gamut conversion matrices corresponding to the target non-uniform pixels, second color gamut conversion matrices corresponding to the transitional pixels and third color gamut conversion matrices corresponding to the target uniform pixels, and obtaining display pixel conversion matrices of light-emitting elements in a display panel corresponding to the pixels, and
obtaining the display image by processing the pixels according to the respective uniformity compensation matrices comprises:
processing each of the target non-uniform pixels according to the corresponding first color gamut conversion matrix and the corresponding display pixel conversion matrix;
processing each of the transitional pixels according to the corresponding second color gamut conversion matrix and the corresponding display pixel conversion matrix; and
processing each of the target uniform pixels according to the corresponding third color gamut conversion matrix and the corresponding display pixel conversion matrix.

10. The method according to claim 9, wherein the first color gamut conversion matrices correspond to a first color gamut, the second color gamut conversion matrices correspond to a second color gamut, and the third color gamut conversion matrices correspond to a third color gamut; and
a range of the first color gamut is larger than a range of the second color gamut, and a range of the second color gamut is larger than a range of the third color gamut.

11. The method according to claim 10, further comprising:
determining the third color gamut according to a common color gamut range of the light-emitting elements;
determining the second color gamut according to the third color gamut and a first ratio; and
determining the first color gamut according to the third color gamut and a second ratio, wherein the second ratio is greater than the first ratio.

12. The method according to claim 10, wherein respectively obtaining the first color gamut conversion matrices corresponding to the target non-uniform pixels, the second color gamut conversion matrices corresponding to the transitional pixels and the third color gamut conversion matrices corresponding to the target uniform pixels comprises:
determining each of the first color gamut conversion matrices according to chromaticity coordinates and brightness corresponding to three primary colors in the first color gamut;
determining each of the second color gamut conversion matrices according to chromaticity coordinates and brightness corresponding to the three primary colors in the second color gamut; and
determining each of the third color gamut conversion matrices according to chromaticity coordinates and brightness corresponding to the three primary colors in the third color gamut.

13. The method according to claim 9, wherein obtaining the display pixel conversion matrices of the light-emitting elements in the display panel corresponding to the pixels comprises:
for each of the light-emitting elements in the display panel corresponding to the pixels, determining the corresponding display pixel conversion matrix according to RGB color data of the light-emitting element.

14. An electronic device, comprising:
one or more processors, and a memory; and
one or more programs, wherein the one or more programs are stored in the memory and executed by the one or more processors, and the one or more programs comprise instructions for executing operates comprising:
obtaining an original image, and for each of pixels in the original image,
converting first color data of the pixel into second color data corresponding to a set color space;
calculating a feature weighted value of the pixel according to the second color data and a preset rule; and
determining a uniformity of the pixels based on the feature weighted values to mark the pixels;
wherein determining the uniformity of the pixels based on the feature weighted values to mark the pixels comprises:
for each of the pixels, determining a feature difference between the feature weighted value of the pixel and the feature weighted value of an adjacent pixel;
in response to determining that the feature difference is greater than a first threshold, marking the pixel as a first-type boundary pixel; and
in response to determining that the feature difference is not greater than the first threshold, marking the pixel as a non-boundary pixel.

15. A nonvolatile computer-readable storage medium of a computer program, wherein when the computer program is executed by one or more processors, the processors are caused to execute the method according to claim 1.

16. The electronic device according to claim 14, wherein the set color space is an HSV color space.

17. The electronic device according to claim 16, wherein the second color data comprises hue data, saturation data and brightness data, and
calculating the feature weighted value of the pixel according to the second color data and the preset rule comprises:
obtaining third color data by preprocessing the second color data;
obtaining quantization values corresponding to the hue data, the saturation data and the brightness data by quantizing the third color data based on a color-based segmentation rule; and
determining the feature weighted value according to the quantization values corresponding to the hue data, the saturation data and the brightness data.

18. The electronic device according to claim 17, wherein obtaining the third color data by preprocessing the second color data comprises:
in response to determining that the brightness data of the second color data is less than a first preset value, determining that the second color data is black data; and
in response to determining that the saturation data of the second color data is less than a second preset value and the brightness data of the second color data is greater than a third preset value, determining that the second color data is white data.

19. A method of processing an image, comprising:
obtaining an original image, and for each of pixels in the original image,
converting first color data of the pixel into second color data corresponding to a set color space;
calculating a feature weighted value of the pixel according to the second color data and a preset rule; and
determining a uniformity of the pixels based on the feature weighted values to mark the pixels;
wherein the set color space is an HSV color space;
wherein the second color data comprises hue data, saturation data and brightness data, and
calculating the feature weighted value of the pixel according to the second color data and the preset rule comprises:
obtaining third color data by preprocessing the second color data;
obtaining quantization values corresponding to the hue data, the saturation data and the brightness data by quantizing the third color data based on a color-based segmentation rule; and
determining the feature weighted value according to the quantization values corresponding to the hue data, the saturation data and the brightness data.

* * * * *